United States Patent [19]

Nameki et al.

[11] 4,354,206

[45] Oct. 12, 1982

[54] TELEVISION RECEIVER

[75] Inventors: Yoshinobu Nameki, Kawagoe; Shin Miyashita, Higashimurayama, both of Japan

[73] Assignee: Sony Corporation, Tokyo, Japan

[21] Appl. No.: 233,390

[22] Filed: Feb. 11, 1981

[30] Foreign Application Priority Data

Feb. 18, 1980 [JP] Japan .............................. 55-19250[U]

[51] Int. Cl.³ ........................ H04N 5/64; H04N 5/655
[52] U.S. Cl. .................................... 358/254; 358/249
[58] Field of Search ............... 358/249, 254, 248, 255; D14/77, 80, 81

[56] References Cited

U.S. PATENT DOCUMENTS

| | | | |
|---|---|---|---|
| 2,413,922 | 1/1947 | Jensen | 358/249 |
| 2,805,411 | 9/1957 | Rose | 358/249 |
| 3,789,140 | 1/1974 | McQueen | 358/254 |
| 3,970,782 | 7/1976 | Fenne | 358/254 |
| 3,970,792 | 7/1976 | Benham | 358/254 |
| 4,021,105 | 5/1977 | Schubach | 358/254 |
| 4,293,878 | 10/1981 | Sanchez | 358/254 |

*Primary Examiner*—Howard Britton
*Attorney, Agent, or Firm*—Hill, Van Santen, Steadman, Chiara & Simpson

[57] ABSTRACT

A small sized televison receiver includes a main body and a base, and the former is rotatably supported on the latter. Substantially whole area of the front surface of the main body is occupied by a television screen, and main control buttons or knobs are disposed on a front end surface of the base, while sub-control buttons or knobs are disposed on the top surface of the base. When the main body is in the horizontal posture relative to the base, the sub-control buttons or knobs are concealed by the main body. The sub-control buttons or knobs are exposed to be operable when the main body is rotated upward and is in the declined posture. The height and the declined angle of the television screen are also changed by the rotation of the main body.

7 Claims, 7 Drawing Figures

TELEVISION RECEIVER

BACKGROUND OF THE INVENTION

1. Field of the Invention

This invention generally relates to a television receiver, and more particularly, the invention is directed to a small sized television receiver of excellent design and of good convenience.

2. Description of Prior Art

In a television receiver, there are provided main control buttons or knobs and sub-control buttons or knobs. Although the main control buttons are frequently operated, the sub-control buttons are rarely operated, and therefore the sub-control knobs are disposed in a recess of a front panel and the recess is ordinary covered by a rid in a large sized television receiver. This arrangement gives television receiver good design or appearance.

But it is impossible to provide sub-control knobs on front panel of the receiver in such a small sized television receiver that the television screen occupies substantially whole area of the front panel. Therefore the sub-control knobs are disposed on side surface of the cabinet and the knobs are exposed outside. This arrangement is inferior in design or appearance.

OBJECTS AND SUMMARY OF THE INVENTION

One object of the present invention is to provide a television receiver of excellent design or appearance.

Another object of the present invention is to provide a minimized television receiver.

A further object of the present invention is to provide a television receiver, sub-control knobs of which are ordinary concealed.

A still further object of the present invention is to provide a television receiver, a television screen of which is movable in height and angle.

According to one aspect of the present invention, there is provided a television receiver comprising: a main body including a television screen disposed on a front surface thereof; a base for mounting said main body thereon; supporting means for rotatably supporting said main body relative to said base; main control means for mainly controlling said receiver, at least one of said main control means being disposed on a front end surface of said base; and sub-control means disposed on a top surface of said base for supplementally controlling said receiver, said sub-control means being concealed by said main body when said main body is horizontally supported on said base, while said sub-control means being exposed to be operable, when said main boy is rotated upward.

The above, and other objects, features and advantages of the invention will be apparent from the following detailed description of an illustrative embodiment which is to be read in connections with the accompanying drawings.

DETAILED DESCRIPTION OF PREFERRED EMBODIMENT

Figure 1:
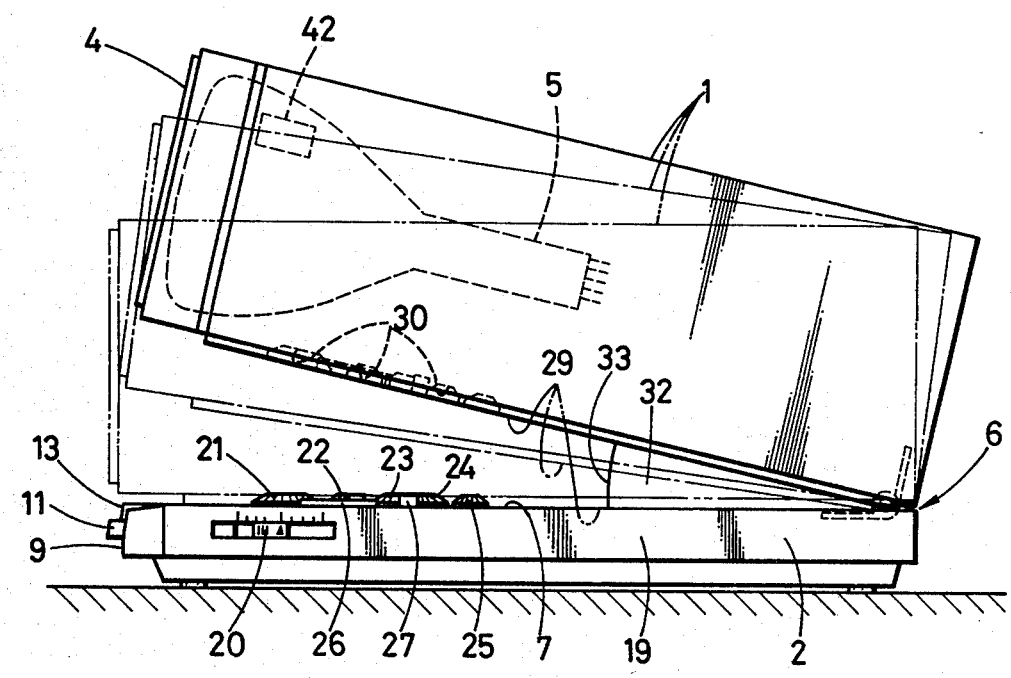
FIG. 1 is a side view of a small sized television receiver according to one embodiment of the present invention.
Figure 2:
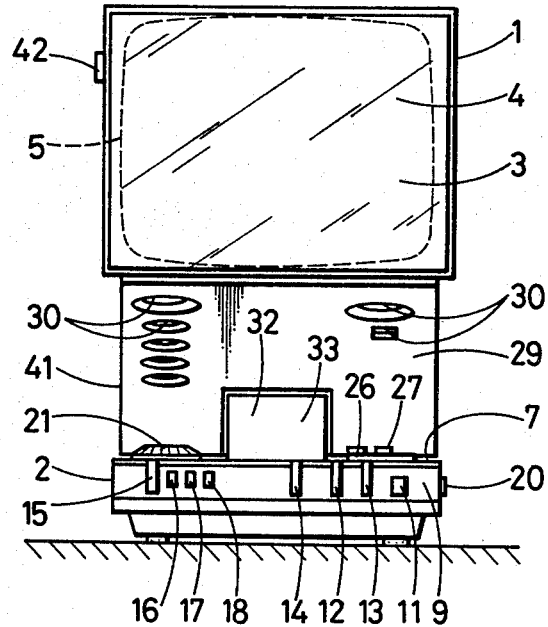
FIG. 2 is a front view of the receiver shown in FIG. 1.
Figure 3:
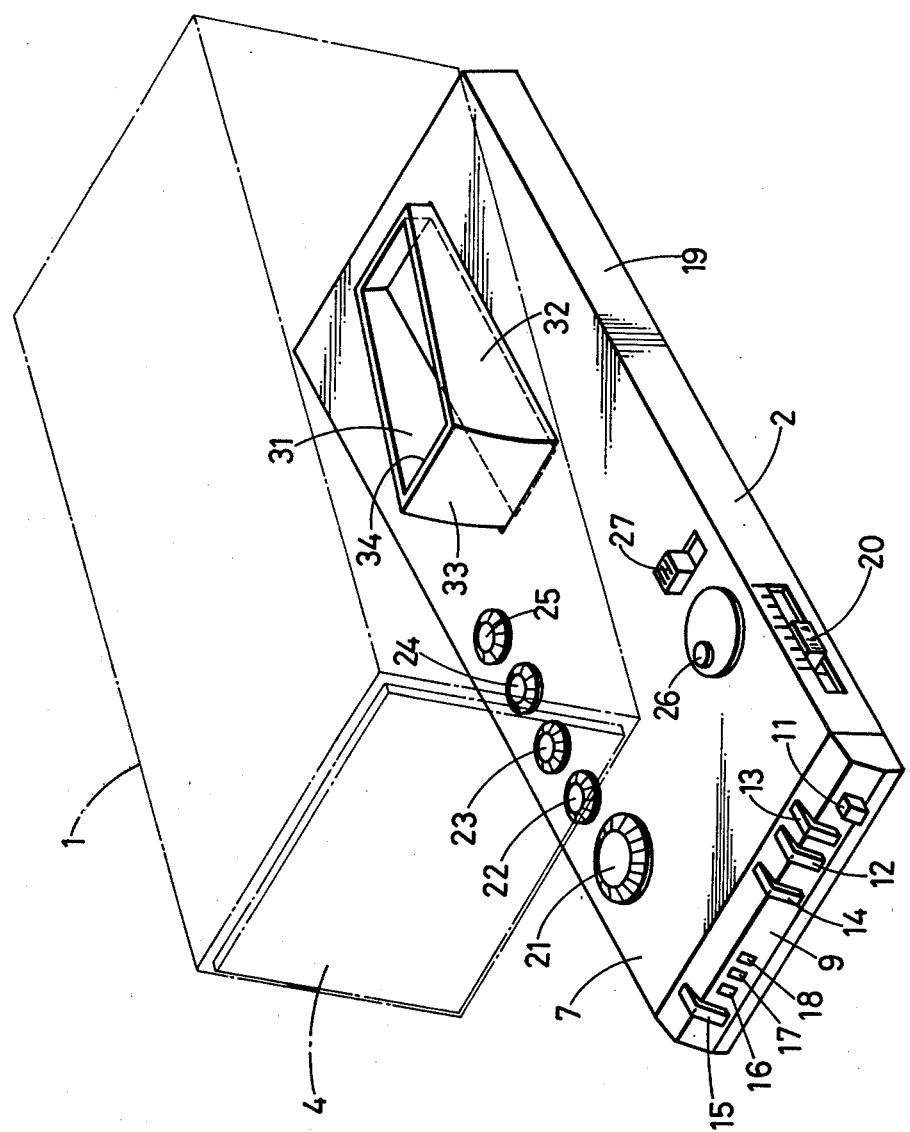
FIG. 3 is a perspective view of a base of the television receiver.
Figure 4:
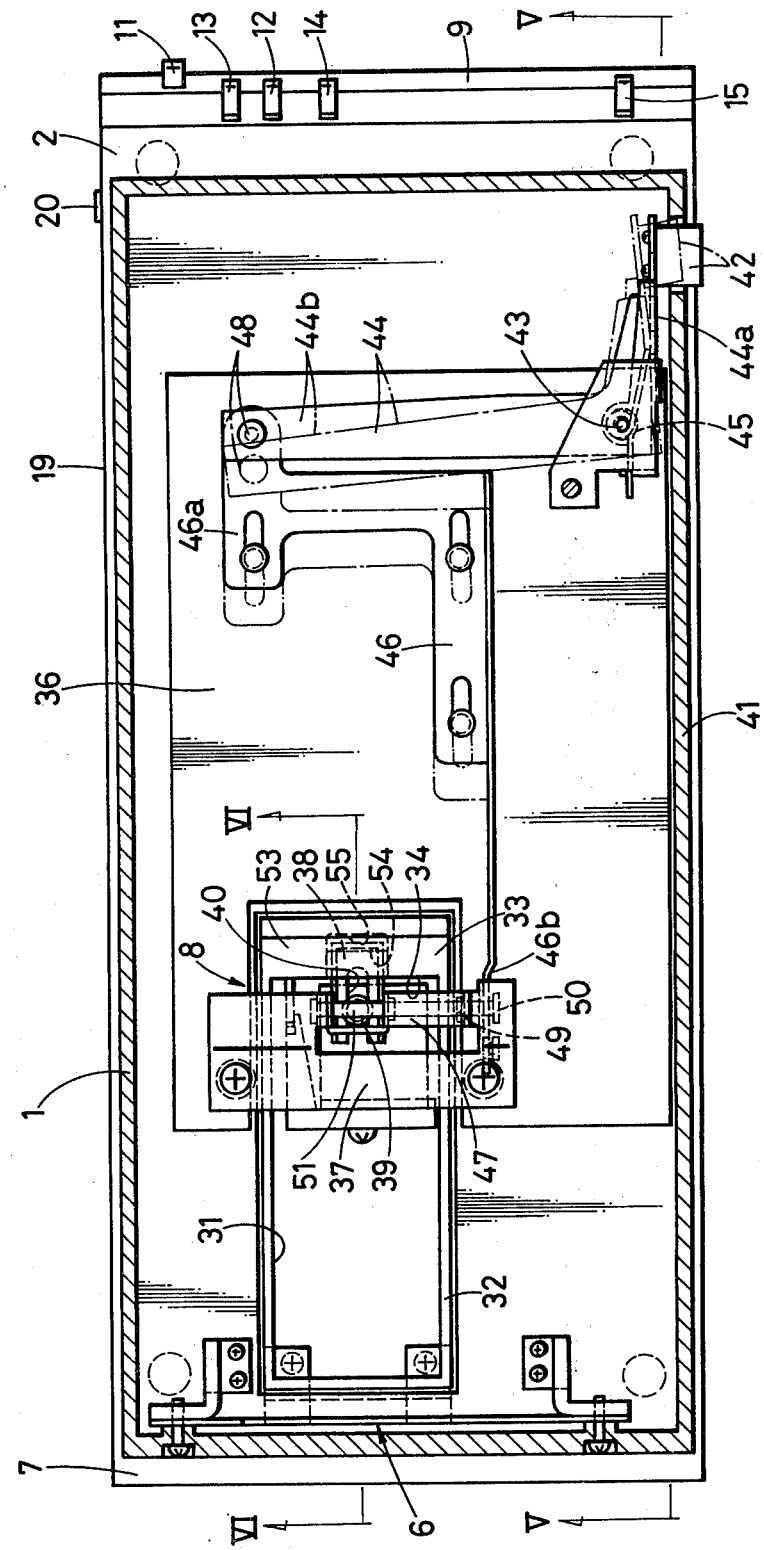
FIG. 4 is a transversely cross sectioned plan view of a main body of the receiver.

FIG. 1 to FIG. 3 show a small sized television receiver according to one embodiment of the present invention. The receiver includes a main body 1 which is mounted on a base 2. Substantially whole area of the front surface 3 of the body 1 is composed of a transparent screen panel 4. A cathode ray tube 5 is disposed in the body 1 and the front screen surface of the tube 5 is faced to the screen panel 4. The main body 1 is rotatably supported by the base 2 through a pivotal supporting mechanism 6 composed of, for example a hinge at the rear side of the top surface 7 of the base 2. Further, there is provided between the main body 1 and the base 2 an angular control mechanism 8 which will be described below. Due to the angular control mechanism, the main body 1 takes three positions relative to the base 2, namely the first position shown by solid line in FIG. 1, the seccond position shown by dot-dashed line in FIG. 1 and the third position shown by two dots-dashed line in FIG. 1. In the first and second positions, the body 1 takes declined postures, and in the third position the main body 1 takes a horizontal posture.

On the fornt end 9 of the base 1, there are provided main control buttons for mainly controlling the television receiver. The main control buttons include a power switch button 11, channel up and down buttons 12 and 13, a channel indicating switch button 14, and a band exchanging switch button 15. Lamps 16 and 17 for indicating high range and low range of VHF band and a lamp 18 for indicating UHF band are also provided on the front end 9 of the base 1. On the right end of the base 1, there is provided a volume control slide 20 which is biasedly positioned at the front side on the end. On the contrary, on the top surface 7 of the base 2, there are provided sub-control knobs for supplementally controlling the television receiver. The sub-control knobs include a picture control knob 21, a bright control knob 22, a color control knob 23, a hue control knob 24, a vertical hold control knob 25, a manual tuning knob 26, an exchanging slide 27 for exchanging the receiver between a manual mode and automatic mode. These knobs or slide are biasedly positioned at the front side on the base 2.

When the main body 1 is rotated to the horizontal posture as shown in two dots-dashed line in FIG. 2, the sub-control knobs 21 to 27 are concealed by the main body 1. The sub-control knobs 21 to 27 have small dimension in the vertical direction or is flat shaped. Further, at the bottom surface 29 of the main body 1, there are provided seven shallow recesses 30 in response to the sub-control knobs 21 to 27. Accordingly, the sub-control knobs 21 to 27 are received in the recesses 30, when the main body 1 is horizontally rotated, and the bottom surface 29 of the main body 1 does not collide with the knobs 21 to 27.

On the contrary, when the main body 1 is declined as shown in dot-dashed or two dots-dashed line in FIG. 1, the sub-control knobs 21 to 27 are exposed and are operable. The declined angle of the main body 1 is alternative and hence the height and angle of the screen panel 4 are also alternative.

Next, there will be described an angular control mechanism 8 for controlling the declined angle of the main body 1 with reference to FIG. 4 to FIG. 7. An opening 31 is defined on the top surface 7 of the base 2 at the rear side in the surface 7. The opening 31 is continued to a substantially rectangular sleeve 32 which is projected upward from the top surface 7 and is inserted into the main body 1 through an opening of the bottom surface 29. The sleeve 32 is provided with three engaging portions 53 to 55 at the inside 34 of front wall 33 of the sleeve 32. The top engaging portion 53 is composed of a top edge of the sleeve 32, while the middle and bottom engaging portions 54 and 55 are composed of recesses formed on the wall of the sleeve 32. The sleeve 32 is mounted on a chassis 35 which is disposed in the base 2. Through the opening 31 and the sleeve 32, there are disposed lead wires which connect electrically the main body 1 and the base 2. A bracket 37 is mounted on a chassis 36 of the main body 1 so that the bracket 37 cooperatively moves with the main body 1. The bracket 37 is inserted into the opening 31 through the sleeve 32. An engaging member 38 is supported by the bracket 37 through a pin 39 and a notch 40 as shown in FIG. 7 in such a manner that the engaging member 38 is forwardly and rearwardly slidable for selectively engaging with the engaging portions 53 to 54.

Figure 5:
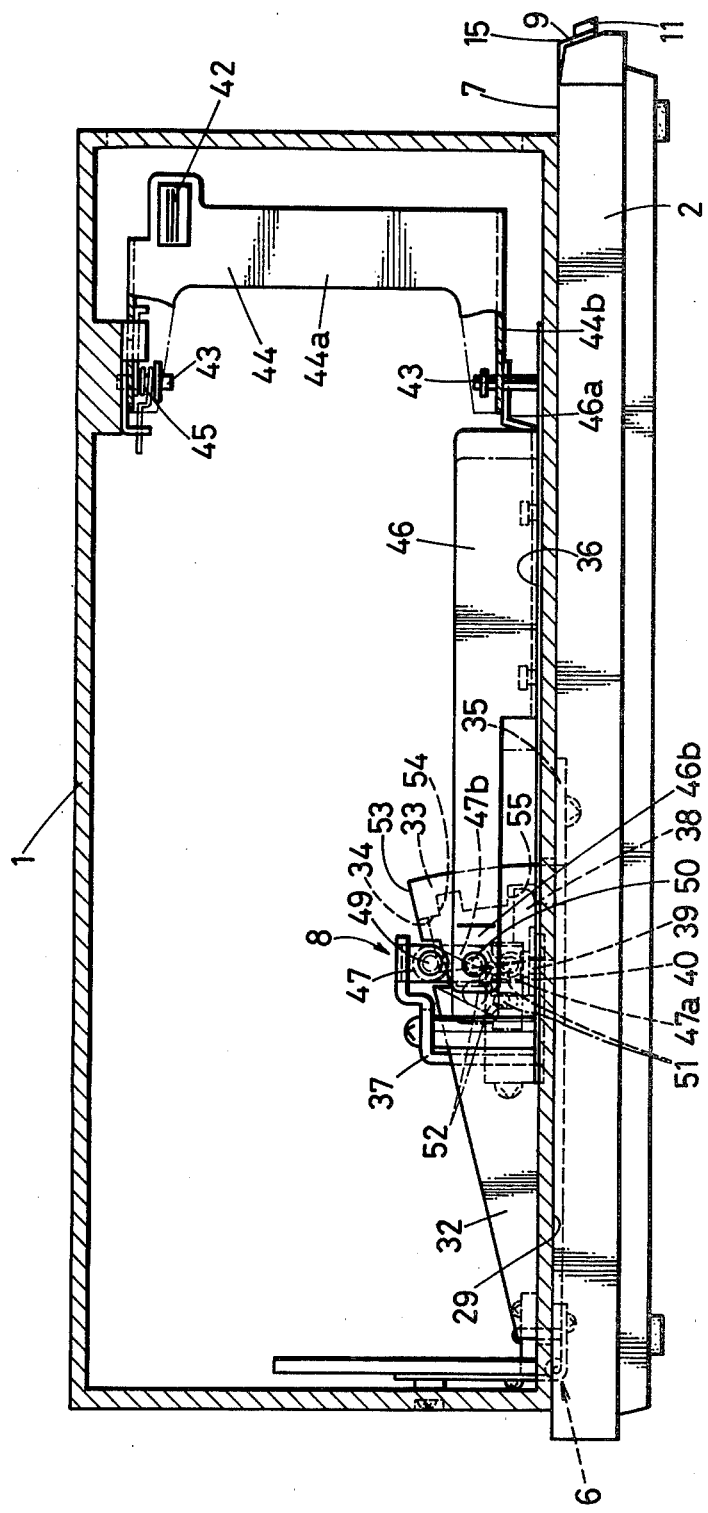
FIG. 5 is a cross sectional view taken on line V—V of FIG. 4.

A release button 42 is disposed at the front side on a side wall surface 41 of the main body 1. A button lever 44 is arranged in the main body 1, and the lever 44 is rotatably supported by a pair of pivot pins 43 as shown in FIG. 5. The release button 42 is fixed at one end 44a of the lever 44. The lever 44 is urged by a torsion spring 45 in clockwise direction in FIG. 4. Further a slide 46 and a lever 47 are disposed in the main body 1, which are forwardly and rearwardly slidable and rotatable respectively. The other end 44b of the button lever 44 is connected with one end 46a of the slide 46 through a pin 48. Still more, the lever 47 is pivotally supported by the bracket 37 through a pivot pin 49. One end 47a of the lever 47 and the other end 46b of the slide 46 are connected each other through a pin 50. The lever 47 has a double U letters shape as shown in FIG. 7, and the other end 47b is provided with a pin 51 which engages with the engaging member 38 through a pair of left and right notchs 52.

Figure 6:
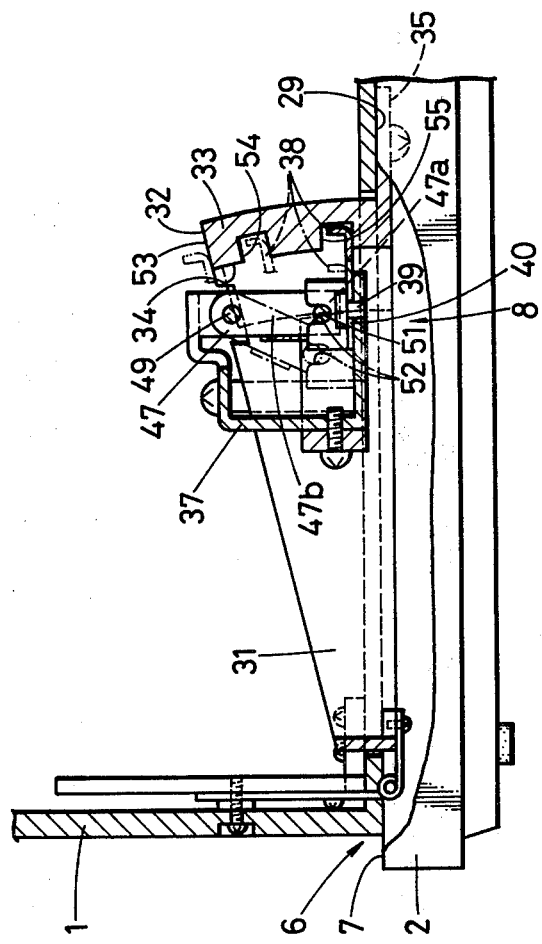
FIG. 6 is a cross sectional view taken on line VI—VI of FIG. 4.
Figure 7:
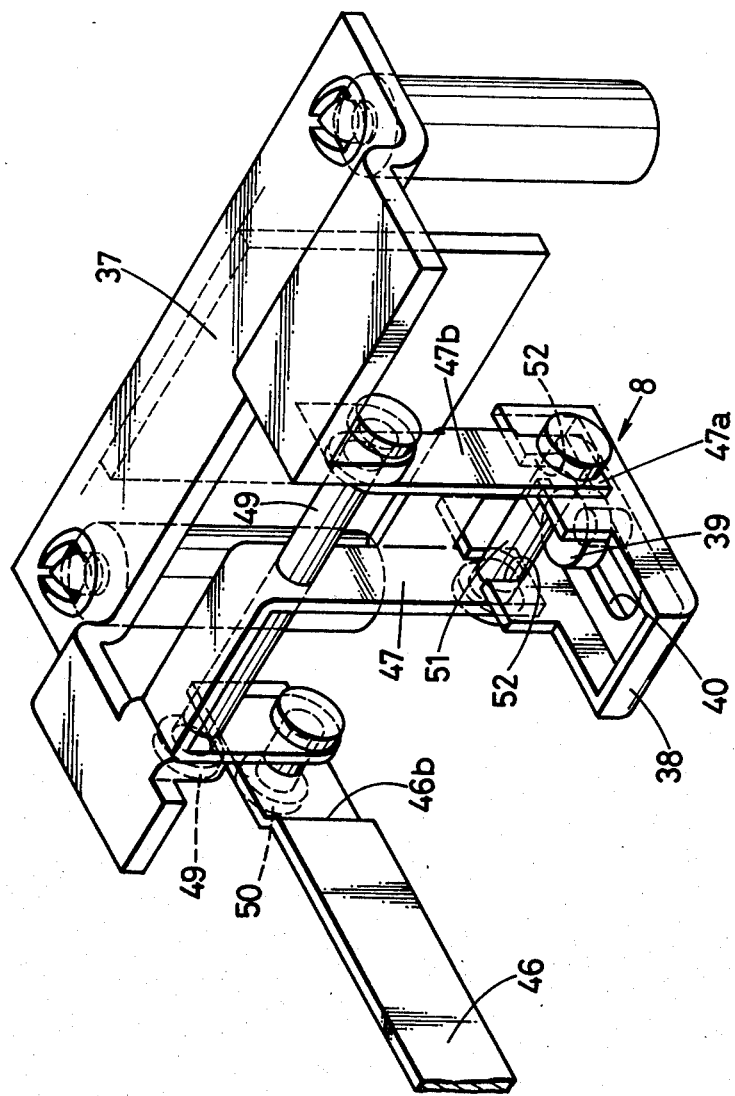
FIG. 7 is a perspective view of a locking mechanism of the receiver.

On operation for alternating the angle of the main body 1, initially the engaging member 38 engages with the recess 55 as shown by solid line in FIG. 6, and the main body 1 is locked by the base 2, when the main body 1 is in the horizontal posture as shown by two dots-dashed line in FIG. 1. When the release button 42 is pushed, the button lever 44 rotates counter-clockwise against the torsion spring 45 as shown by dot-dashed line in FIG. 4, and the slide 46 moves rearwardly as shown by dot-dashed line in FIG. 4 and FIG. 5 by the other end 44b of the lever 44. Then the lever 47 is rotated clockwise as shown by dot-dashed line in FIG. 5 and FIG. 6 by the other end 46b of the slide 46, and the engaging member 38 moves rearwardly as shown by dot-dashed line in FIG. 6 by the pin 51 of the lever 47. Hence the member 38 breaks away from the recess 55, and the lock of the main body 1 relative to the base 2 is released.

For declining the main body 1 relative to the base 2, the body 1 is rotated around the pivotal support 6 as shown by solid line or dot-dashed line in FIG. 1. Then the engaging member 38 moves to the upper position or middle position response to the upper top edge 53 or the recess 54 respectively. In these states, the depression of the release button 42 is cancelled, and then the lever 44 rotates clockwise or is restored to the original position shown by solid line in FIG. 4 by the torsion spring 45. Accordingly the slide 46 and the lever 47 are restored to the original position shown by solid line in FIG. 4 to FIG. 6, and the engaging member 38 is engaged with the top edge 53 or the recess 54 selectively as shown by dot-dashed line or dashed line respectively in FIG. 6. Thereby the main body 1 is locked by the base 2 in the declined posture shown by solid line or dot-dashed line in FIG. 1. Although the upper engaging portion is composed of a top edge and not of a recess, the body 1 is locked by the contact of the engaging member 38 and the top edge 53, because the further upward rotation of the body 1 is prevented.

For accomplishing the above mentioned alternation of the posture of the main body 1, an operator shakes the both side of the main body 1 by one hand, and also depresses the release button 42 by a finger of the hand. Then the operator lifts up the front side of the body 1 to rotate the body 1 relative to the base 2. When the body 1 is lifted to the position shown by solid line or dashed line in FIG. 1, the operator releases the depression of the button 42 to lock the main body 1 with the base 2. Thus the alternation of the declined angle or the posture of the body 1 is very easily accomplished.

As mentioned above, according to the preferred embodiment of the present invention, the sub-control knobs or slides 21 to 27 are concealed by the main body 1 when the body 1 is horizontally mounted on the base 2, which provides an excellent design on television receiver. When necessary, the main body 1 is rotated upward relative to the base 2 to expose the sub-control knobs 21 to 27 and to cause the knobs 21 to 27 operable. At the same time, the height and the angle of the television screen 4 are also regulated, and by this reason the television receiver is very functional and very convenient. Further, according to this embodiment, the television receiver is minimized because the sub-control knobs 21 to 27 are disposed on the top surface 7 of the base 2.

Having described specific embodiments of this invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A television receiver comprising:
   a main body including a television screen disposed on a front surface thereof;
   a base for mounting said main body thereon;
   supporting means for rotatably supporting said main body relative to said base;
   main control means for mainly controlling said receiver, at least one of said main control means being disposed on a front end surface of said base; and
   sub-control means disposed on a top surface of said base for supplementally controlling said receiver, said sub-control means being concealed by said main body when said main body is horizontally supported on said base, while said sub-control means being exposed to be operable when said main body is rotated upward.

2. A television receiver according to claim 1, wherein substantially whole area of the front surface of said main body is occupied by said televison screen, and said main control means is disposed on end surfaces of said base.

3. A television receiver according to claim 1, wherein said sub-control means is comprised of plural knobs which are mounted on the top surface of said base, and in response to said knobs there are provided plural recesses on the bottom surface of said main body, said knobs being received in the respective recesses when said main body is in the horizontal posture.

4. A television receiver according to claim 3, wherein said knobs have flat shape and said recesses are shallow.

5. A television receiver according to claim 1, wherein said supporting means is provided with locking means which locks said main body in plural locking position selectively and maintains said main body in respective locking positions.

6. A television receiver according to claim 5, wherein said supporting means is further provided with releasing means which is interlocked with said locking means for releasing said lock and for permitting the rotation of said main body relative to said base.

7. A television receiver according to claim 6, wherein said locking means is comprised of an engaging member which is slidably supported on a bracket fixed on said main body and said engaging member is selectively engaged with a top edge or a recess formed on a wall of a substantially rectangular sleeve member, said sleeve member being mounted on said base and receiving said bracket.

* * * * *